(12) United States Patent
Muto et al.

(10) Patent No.: US 9,991,685 B2
(45) Date of Patent: Jun. 5, 2018

(54) ELECTRICAL JUNCTION BOX

(71) Applicant: YAZAKI CORPORATION, Minato-ku, Tokyo (JP)

(72) Inventors: Bunpei Muto, Utsunomiya (JP); Shinichi Akiyama, Utsunomiya (JP); Hiroaki Yamada, Makinohara (JP); Yukihiro Kawamura, Makinohara (JP); Hiroyasu Furuya, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days. days.

(21) Appl. No.: 15/352,785

(22) Filed: Nov. 16, 2016

(65) Prior Publication Data

US 2017/0063053 A1 Mar. 2, 2017

Related U.S. Application Data

(63) Continuation of application No. PCT/JP2015/066415, filed on Jun. 5, 2015.

(30) Foreign Application Priority Data

Jun. 6, 2014 (JP) .................................. 2014-117714

(51) Int. Cl.
*H02G 3/08* (2006.01)
*H02B 1/32* (2006.01)
(Continued)

(52) U.S. Cl.
CPC ............... *H02B 1/32* (2013.01); *B60R 16/02* (2013.01); *B60R 16/0238* (2013.01);
(Continued)

(58) Field of Classification Search
None
See application file for complete search history.

(56) References Cited

U.S. PATENT DOCUMENTS 5,764,487 A * 6/1998 Natsume ............. B60R 16/0238
174/72 B
6,022,247 A * 2/2000 Akiyama ............ B60R 16/0238
439/701
(Continued)

FOREIGN PATENT DOCUMENTS

CN 101291049 A 10/2008
JP H10-229621 A 8/1998
(Continued)

OTHER PUBLICATIONS

The First Office Action from The State Intellectual Property Office of the People's Republic of China dated Aug. 25, 2017 in related Chinese application No. 2015/80030147.8.
(Continued)

*Primary Examiner* — Xanthia C Cunningham
(74) *Attorney, Agent, or Firm* — Morgan, Lewis & Bockius LLP

(57) ABSTRACT

An electrical junction box includes: an electrical junction box housing; and a common relay block, an individual corresponding relay block, a common power supply block, and an individual corresponding semiconductor module. The common relay block, the individual corresponding relay block, the common power supply block, and the individual corresponding semiconductor module are attached to the electrical junction box housing.

5 Claims, 15 Drawing Sheets

(51) Int. Cl.
*B60R 16/02* (2006.01)
*H01R 13/504* (2006.01)
*H01R 13/514* (2006.01)
*B60R 16/023* (2006.01)
*H02G 3/16* (2006.01)
*H01H 85/20* (2006.01)

(52) U.S. Cl.
CPC ......... *H01R 13/504* (2013.01); *H01R 13/514* (2013.01); *H02G 3/08* (2013.01); *H02G 3/086* (2013.01); *H01H 85/205* (2013.01); *H02G 3/16* (2013.01)

(56) References Cited

U.S. PATENT DOCUMENTS

| 9,293,276 B2 * | 3/2016 | Kawamura | .......... H01R 33/975 |
| 2002/0197893 A1 | 12/2002 | Hiroyuki et al. | |
| 2004/0029420 A1 * | 2/2004 | Yamaguchi | .......... H01R 9/2466 |
| | | | 439/76.2 |
| 2008/0261459 A1 | 10/2008 | Choi | |
| 2009/0203236 A1 * | 8/2009 | Akahori | .............. B60R 16/0238 |
| | | | 439/76.1 |

FOREIGN PATENT DOCUMENTS

| JP | 2003-009347 A | 1/2003 |
| JP | 2003-125516 A | 4/2003 |
| JP | 2010-029011 A | 2/2010 |
| JP | 2012-105434 A | 5/2012 |

OTHER PUBLICATIONS

International Search Report dated Aug. 18, 2015, for International Patent Application No. PCT/JP2015/066415.
International Preliminary Report on Patentability dated Dec. 15, 2016, for International Patent Application No. PCT/JP2015/066415.
Japanese Office Action dated Oct. 31, 2017 in corresponding Japanese Patent Application No. 2014-117714 with machine English translation of same.

* cited by examiner

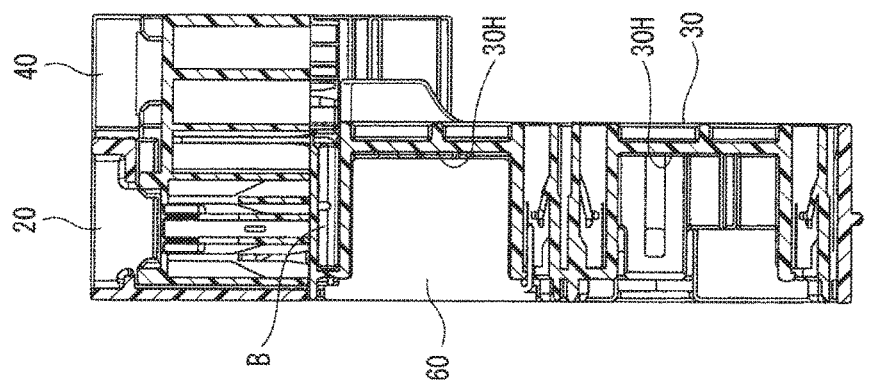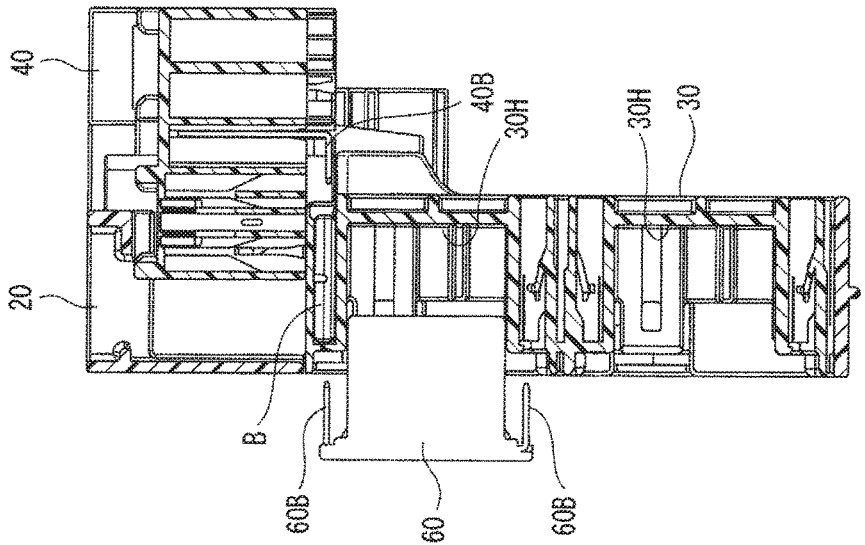

ELECTRICAL JUNCTION BOX

CROSS REFERENCE TO RELATED APPLICATION(S)

This application is a continuation of PCT application No. PCT/JP2015/066415, which was filed on Jun. 5, 2015, based on Japanese Patent Application (No. 2014-117714) filed on Jun. 6, 2014, the contents of which are incorporated herein by reference.

BACKGROUND OF THE INVENTION

1. Field of the Invention

The present invention relates to an electrical junction box (an electric junction block) such as a relay box or a fuse box for use in a vehicle such as a car, and particularly relates to a cassette type electrical junction box in which a cassette is inserted in use.

2. Description of the Related Art

An example of such a cassette type electrical junction box in which a cassette is inserted in use includes an electrical junction box disclosed in JP-A-2010-29011. This cassette type electrical junction box can deal with a change to another specification of a cassette in spite of use of the cassette having the same structure, while the cassette type electrical junction box can enhance the degree of freedom in the insertion direction of the cassette. In the cassette type electrical junction box, a first cassette insertion portion to which a first cassette can be inserted is a hole penetrating the electrical junction box in the insertion direction of the first cassette, and a first locking member and a second locking member are provided in the inner wall of the first cassette insertion portion. The first locking member can lock the first cassette inserted from a first insertion direction, which is an insertion direction from one end side of the hole. The second locking member can lock a second cassette inserted from a second insertion direction, which is an insertion direction from the other end side of the hole. In this manner, a cassette inserted from any direction selected from the first insertion direction and the second insertion direction of the cassette type electrical junction box can be inserted into the cassette type junction box.

However, the cassette type electrical junction box belongs to a background-art cassette type electrical junction box that should be designed for each kind of vehicle. The cassette type electrical junction box cannot be used in common among kinds of vehicles.

SUMMARY OF THE INVENTION

As has been described, the background-art cassette type electrical junction box is designed individually and independently for each kind of vehicle or each grade. Therefore, the shape of the cassette type electrical junction box differs from one kind of vehicle to another or from one grade to another. The cassette type electrical junction box is low in versatility.

In addition, a large number of relays or fuses are stored in such a cassette type electrical junction box. Work of U-turn connection among the relays or fuses through electric wires must be carried out manually. Thus, the productivity deteriorates.

The present invention has been developed in consideration of the foregoing situation. An object of aspects of the invention is to provide an electrical junction box capable of being used among kinds of vehicles or grades due to (a) automation, (b) common usage, (c) simplification, (d) modularization, and (e) common structure.

The electrical junction box (100) of aspects of the present invention includes aspects [i] to [vi].

[i] An electrical junction box (cassette type electrical junction box 100) including: an electrical junction box housing (10); and a common relay block (20), an individual corresponding relay block (30), a common power supply block (40), and an individual corresponding semiconductor module (50), which are attached to the electrical junction box housing.

[ii] The electrical junction box (100) according to the configuration [i], wherein the electrical junction box housing (10) includes a storing chamber, and wherein at least one block of the common relay block (20), the individual corresponding relay block (30) and the common power supply block (40), and the individual corresponding semiconductor module (50) are stored in the storing chamber of the electrical junction box housing (10), and a block that is not stored is stored in a storing chamber formed in the block that is stored.

[iii] The electrical junction box (100) according to the configuration [ii], wherein the common relay block (20) has an individual corresponding relay block storing chamber (23H) and a common power supply block storing chamber (24H), and wherein the individual corresponding relay block (30) is stored in the individual corresponding relay block storing chamber (23H), and the common power supply block (40) is stored in the common power supply block storing chamber (24H).

[iv] The electrical junction box (100) according to the configuration [ii] or [iii], wherein the individual corresponding semiconductor module (50) includes a plurality of kinds of modules (individual corresponding semiconductor modules 51, 52 and 53) having a same shape.

[v] The electrical junction box (100) according to any one of the configurations [i] to [iv], wherein each of the common relay block (20), the individual corresponding relay block (30), the common power supply block (40) and the individual corresponding semiconductor module (50) includes a bus bar that is electrically connectable to one another when fitted to one another.

[vi] The electrical junction box (100) according to any one of the configurations [i] through [v], wherein each of the electrical junction box housing (10), the common relay block (20), the individual corresponding relay block (30), the common power supply block (40) and the individual corresponding semiconductor module (50) includes a guide portion that can guide one another and a locking portion that can lock one another when fitted to one another.

According to the electrical junction box having the aforementioned configuration [i], the combination of the common relay block (20) and the common power supply block (40) is further combined with the most suitable individual corresponding relay block (30) and the most suitable individual corresponding semiconductor module (50). Thus, an electrical junction box for a desired kind of vehicle can be formed easily.

According to the electrical junction box having the aforementioned configuration [ii], blocks that are not stored in the electrical junction box housing (10) are stored in storing spaces of blocks that are stored in the electrical junction box housing. Thus, a small-sized electrical junction box can be formed.

According to the electrical junction box having the aforementioned configuration [iii], the common relay block (20) includes the individual corresponding relay block storing chamber (23H) and the common power supply block storing chamber (24H). Thus, a smaller-sized electrical junction box can be formed.

According to the electrical junction box having the aforementioned configuration [iv], the individual corresponding semiconductor module (50) includes a plurality of kinds of modules (51, 52 and 53) having one and the same shape. Of the modules, the most suitable individual corresponding semiconductor module can be selected. Thus, an electrical junction box for a desired kind of vehicle can be obtained.

According to the electrical junction box having the aforementioned configuration [v], each block includes bus bars that can be electrically connected to bus bars of another block. Only if the blocks are mechanically fitted to each other, the blocks can be also electrically connected to each other. U-turn connection of electric wires carried out manually in the background art is not necessary. Thus, the productivity is improved.

According to the electrical junction box having the aforementioned configuration [vi], each block includes guide portions for guiding another block and locking portion for locking another block when the blocks are fitted to each other. Thus, the blocks can be fitted to each other easily. In addition, once the blocks have been fitted to each other, they can be prevented from being released from the fitting.

BRIEF DESCRIPTION OF THE DRAWINGS

FIG. 12A and FIG. 12B are longitudinally sectional views of the male/female parts of the bus parts in FIG. 11, in which the relays (60) of the individual corresponding relay block (30) are electrically connected to the common power supply block (40), FIG. 12A showing a state before fitting, FIG. 12B showing a state after fitting.

DETAILED DESCRIPTION OF THE EXEMPLARY EMBODIMENTS

<Current Situation of Cassette Type Electrical Junction Box>

Background-art cassette type electrical junction boxes have been designed individually and respectively in accordance with kinds of vehicles or grades. The shapes of the background-art cassette type electrical junction boxes differ from one kind of vehicle to another or from one grade to another. The background-art cassette type electrical junction boxes are low in versatility.

In addition, a large number of relays or fuses are stored in such a cassette type electrical junction box. Work of U-turn connection for connecting the relays or fuses to one another through electric wires must be carried out manually. Thus, the productivity deteriorates.

The embodiment of the present invention has been developed while paying attention to those points. According to the embodiment of the invention, (a) automation, (b) common usage, (c) simplification, (d) modularization, and (e) common structure can be achieved as much as possible.

For example, fan motor relays and so on can be standardized because they are used independently of kinds of vehicles or grades. However, their loads are so large that they cannot be implemented electronically. Therefore, they must be implemented by relays and bus bars.

Engine control relays and so on can be also standardized because they are used independently of kinds of vehicles or grades. In addition, their loads are so small that they can be implemented electronically.

On the other hand, fog lamps and so on are used depending on kinds of vehicles or grades. However, their loads are so small that they can be implemented electronically.

The aforementioned facts will be verified below for each relay.

<Concept of Embodiment of the Invention>

Of various kinds of relays, relays that can be implemented electronically together with fuse blocks, mini-fuses, diodes, etc. are implemented electronically. Of them, relays that can be used in common among all the kinds of vehicles are shared, while relays peculiar to each kind of vehicle are implemented individually. For example, a criterion for determination about whether a relay should be mounted or not depends on the magnitude of the current capacity of the relay. A relay whose capacity is too large to be mounted in a semiconductor module is stored in a relay block. Of such relays, relays that can be used in common among all the kinds of vehicles are stored in a common relay block, and relays peculiar to each kind of vehicle are stored in an individual corresponding relay block.

Figure 15:
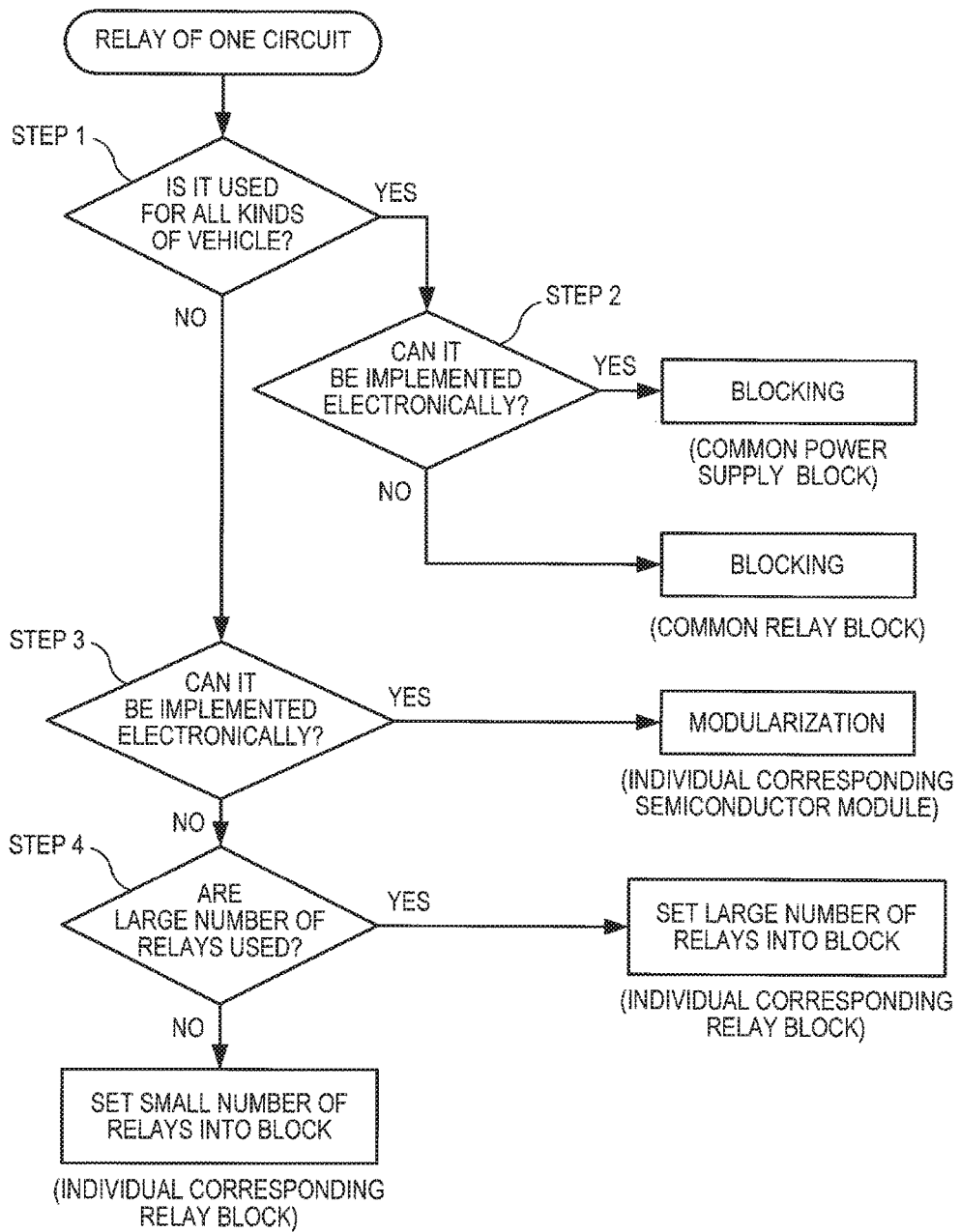
FIG. 15 is a flow chart showing the concept of an embodiment of the invention.

The aforementioned concept can be expressed by a flow chart in FIG. 15.

<Flow Chart in FIG. 15>

When the flow chart in FIG. 15 is used, a block group to which a relay used in one circuit should belong can be determined.

<Common Power Supply Block>

First, in Step S1, it is determined "whether a relay circuit in question is used in all the kinds of vehicles or not". If yes, it is determined in Step S2 "whether the relay circuit can be implemented electronically or not". If it can be implemented electronically, such relays that can be standardized and implemented electronically are collected and set into a single block (cassette) together with electronic parts such as fuses and so on that can be implemented electronically. The block is named "common power supply block".

<Common Relay Block>

When it is determined in Step S2 that the relay circuit cannot be implemented electronically, only such relay circuits that can be standardized are collected and set into a single block (cassette). The block is named "common relay block".

<Individual Semiconductor Relay Block>

Return to Step S1. When the relay circuit is not used in all the kinds of vehicles, it is determined in Step S3 "whether the relay circuit can be implemented electronically or not". If it can be implemented electronically, the relay circuit can be implemented individually and electronically. Only such individual relay circuits are collected and set into a single block (cassette). The block is named "individual semiconductor relay block".

<Individual Corresponding Relay Block>

When it is determined in Step S3 that the relay circuit cannot be implemented electronically, only such individual relay circuits are collected and set into a single block (cassette). The block is named "individual corresponding relay block".

In this case, as the relay circuits collected here, a large number of relay circuits are used in a luxury vehicle, and a required minimum number of relay circuits are used in a light vehicle. It can be therefore considered that all the circuits are set into a single block including a large number of relay circuits for use in a luxury vehicle (the greater embraces the less). In the embodiment of the invention, such an idea is not used, but the circuits are divided into an individual corresponding relay block for luxury vehicles, and an individual corresponding relay block for light vehicles. This is carried out in Step S4. An individual corresponding relay block for luxury vehicles is set when a predetermined (large) number of relays are used, and an individual corresponding relay block for light vehicles is set when a predetermined (large) number of relays are not used.

<Grouping into Four>

Thus, as a result of the aforementioned flow, the blocked relay circuits are classified into the following four groups (1A, 1B, 2A and 2B).

(1) Groups of relays for small-current loads such as head lights, which are implemented electronically.

(1A) Of the relays to be implemented electronically, relays that can be used in common among all the kinds of vehicles are stored in a common power supply block (40).

(1B) Of the relays to be implemented electronically, relays differing from one kind of vehicle to another cannot be used in common. Accordingly, individual corresponding semiconductor modules (50a, 50b, 50c, . . . ) differing from one kind of vehicle to another are prepared respectively.

(2) Groups of relays for large-current loads such as fan motors, which are not implemented electronically because it is difficult to implement them electronically.

(2A) Of the relays that are not implemented electronically, relays that can be used in common among all the kinds of vehicles (for example, relays for an engine control system and so on) are stored in a common relay block (20).

(2B) Of the relays that are not implemented electronically, relays differing from one kind of vehicle to another cannot be used in common (for example, relays for a hybrid vehicle) are stored in an individual corresponding relay block (30).

A cassette type electrical junction box (100) blocked thus according to the embodiment of the invention will be described below with reference to the drawings.

<Configuration of Cassette Type Electrical Junction Box 100 According to the Embodiment of the Invention>

Figure 1:
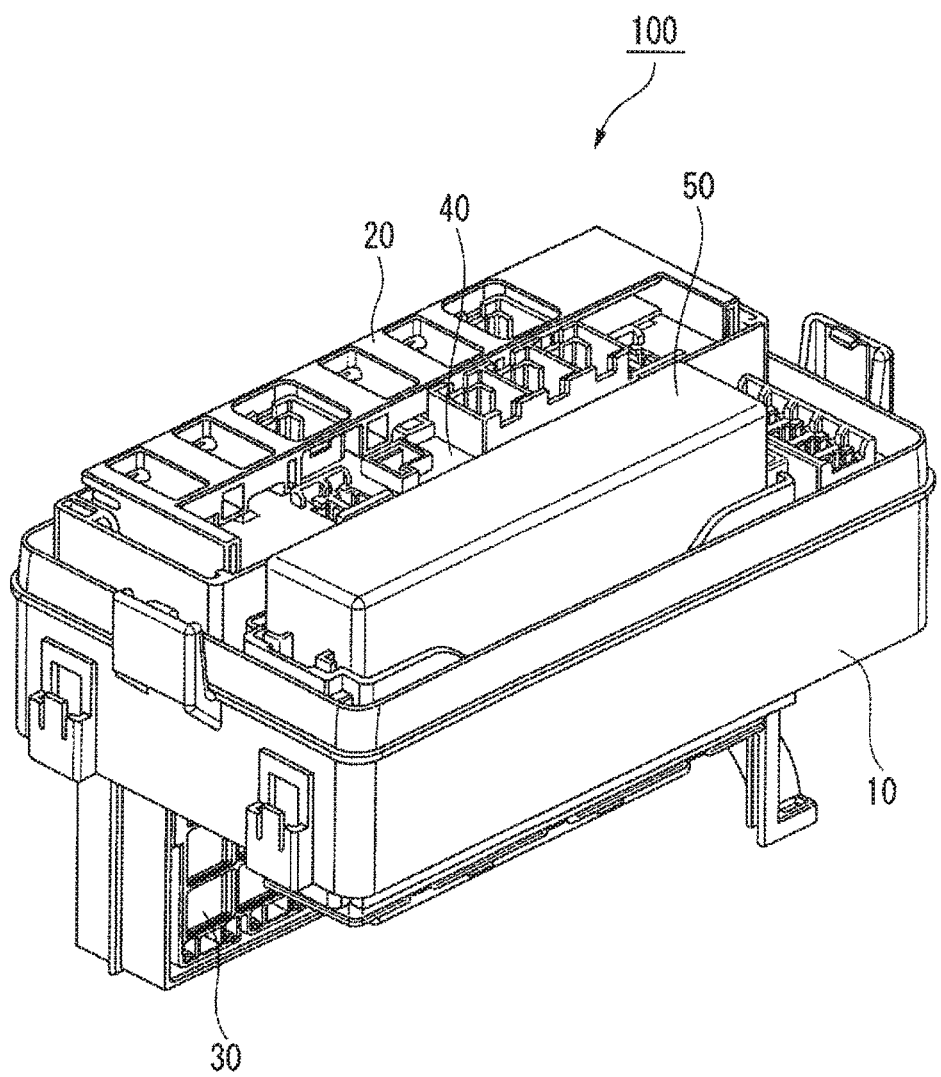
FIG. 1 is a perspective view of a cassette type electrical junction box (100) according to an embodiment of the invention.

The cassette type electrical junction box 100 in FIG. 1 is a cassette type electrical junction box implemented based on the aforementioned concept. FIG. 1 is a perspective view of the cassette type electrical junction box 100 according to the embodiment of the invention, which is constituted by an electrical junction box housing 10 including a plurality of storing chambers, a common relay block 20, an individual corresponding relay block 30, a common power supply block 40, and an individual corresponding semiconductor module 50. These members will be described below.

<Electrical Junction Box Housing 10>

Figure 2:
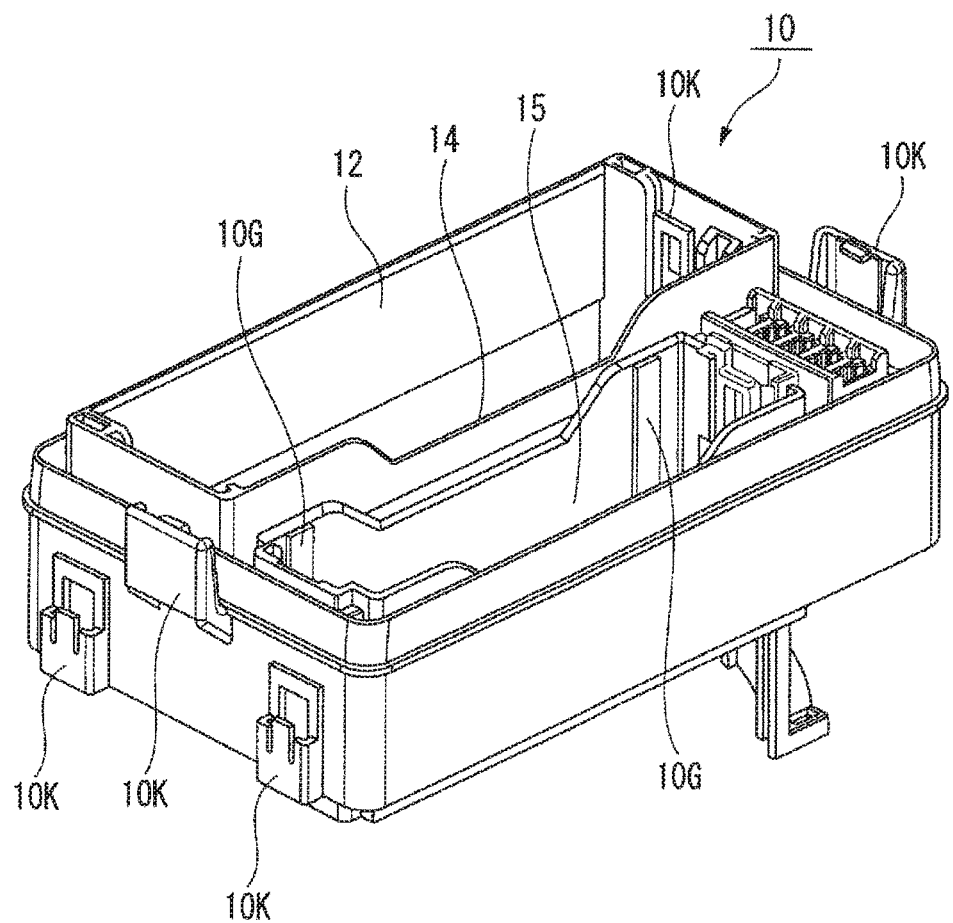
FIG. 2 is a perspective view of an electrical junction box housing (10), which is a constituent part of the cassette type electrical junction box in FIG. 1.

The electrical junction box housing 10 is a housing made of a plastic molding for storing a plurality (four in the drawings) of blocks and modules. In FIG. 2, the electrical junction box housing 10 internally has a common relay storing chamber 12, a common power supply block storing chamber 14 and an individual corresponding semiconductor module storing chamber 15.

Figure 6:
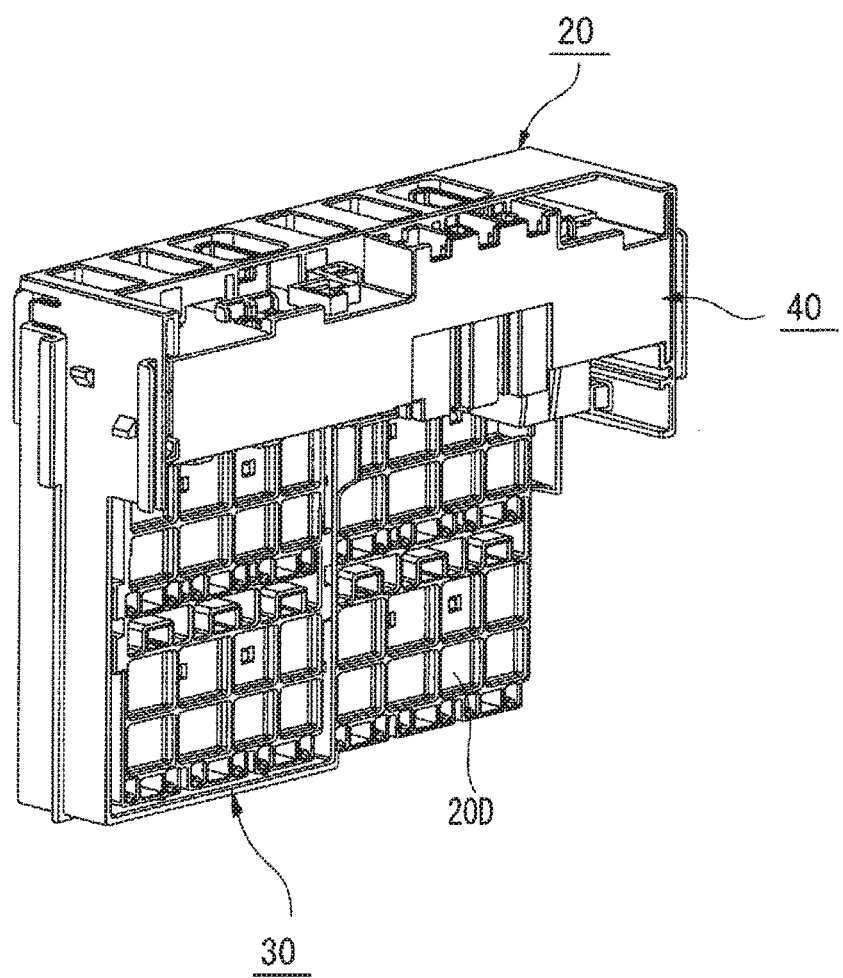
FIG. 6 is a perspective view of the common relay block (20) in which the individual corresponding relay block (30) in FIG. 3 and the common power supply block (40) have been stored.

As shown in FIG. 6, almost half the common power supply block 40 is stored in a part of the space of the common relay block 20, and the other half is exposed from the common relay block 20. In addition, the individual corresponding relay block 30 is entirely stored in the space of the common relay block 20. Accordingly, as shown in FIG. 1, when the common relay block 20 is stored in the common relay storing chamber 12 of the electrical junction box housing 10, the electrical junction box housing 10 can store the common relay block 20, the individual corresponding relay block 30, the common power supply block 40, and the individual corresponding semiconductor module 50 as a result.

Inside the electrical junction box housing 10, guide portions 10G are provided at suitable places as shown in FIG. 2, so that these members can be fitted easily.

In addition, outside the electrically junction box housing 10, locking portions 10K locking engagement portions of the mating members are provided at suitable places as shown in FIG. 2, so that the electrically junction box housing 10 can be prevented from being released from the fitting to the members.

<Common Relay Block 20>

Figure 3:
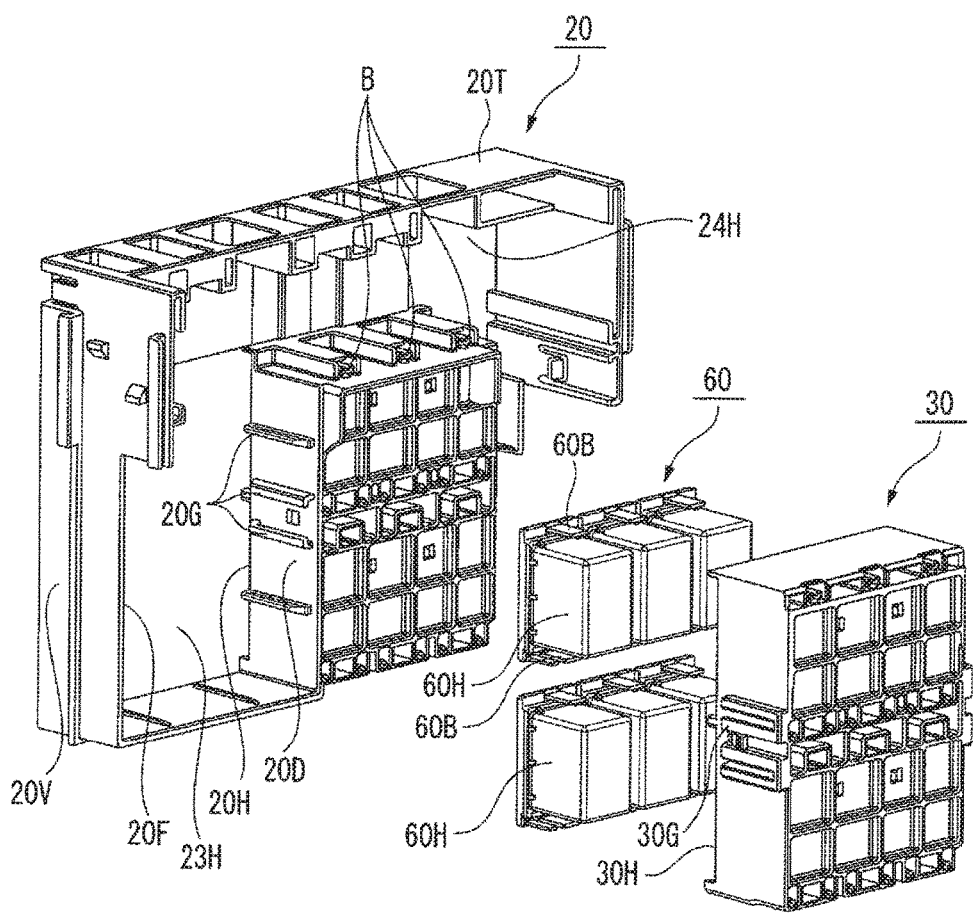
FIG. 3 is a perspective view of constituent parts of the cassette type electrical junction box (100) in FIG. 1, including a common relay block (20), an individual corresponding relay block (30) to be stored in an individual corresponding relay block storing chamber (23H) of the common relay block (20), and six relays (60) to be stored in the individual corresponding relay block (30).

As shown in FIG. 3, the common relay block 20 is a plastic molding to be stored in the common relay storing chamber 12 of the electrical junction box housing 10. The common relay block 20 is constituted by a ceiling portion 20T, and a vertical wall 20V extending downward from the ceiling portion 20T.

<Ceiling Portion 20T>

Figure 9:
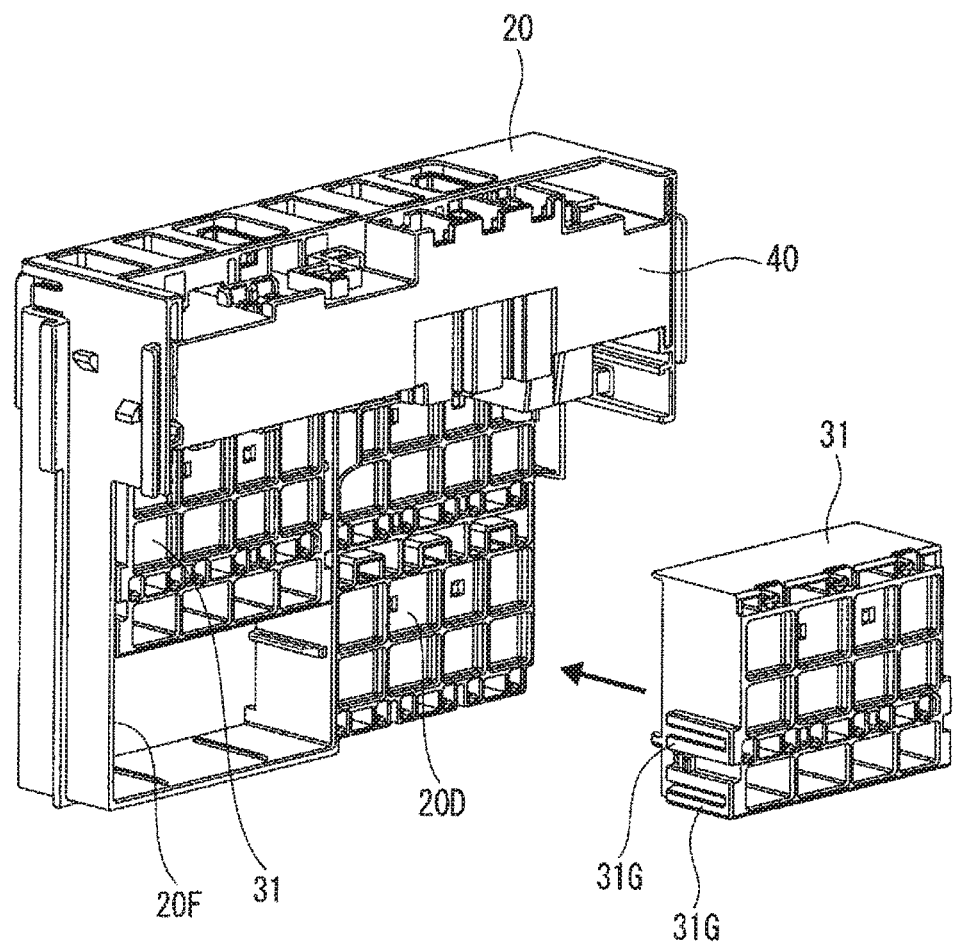
FIG. 9 is a perspective view of the common relay block (20) in which the individual corresponding relay block (31) in FIGS. 5A and 5B and the common power supply block (40) in FIG. 4 have been stored.

A common power supply block storing chamber 24H in which the common power supply block 40 (FIG. 4) can be stored sideways is formed on the back side of the ceiling portion 20T (see FIG. 6 and FIG. 9, in which the common power supply block 40 is stored).

<Vertical Wall 20V>

The vertical wall 20V is constituted by a thick portion 20D located in the right half in FIG. 2, and a frame portion 20F in a large space on the left side.

<Thick Portion 20D>

Figure 14A:
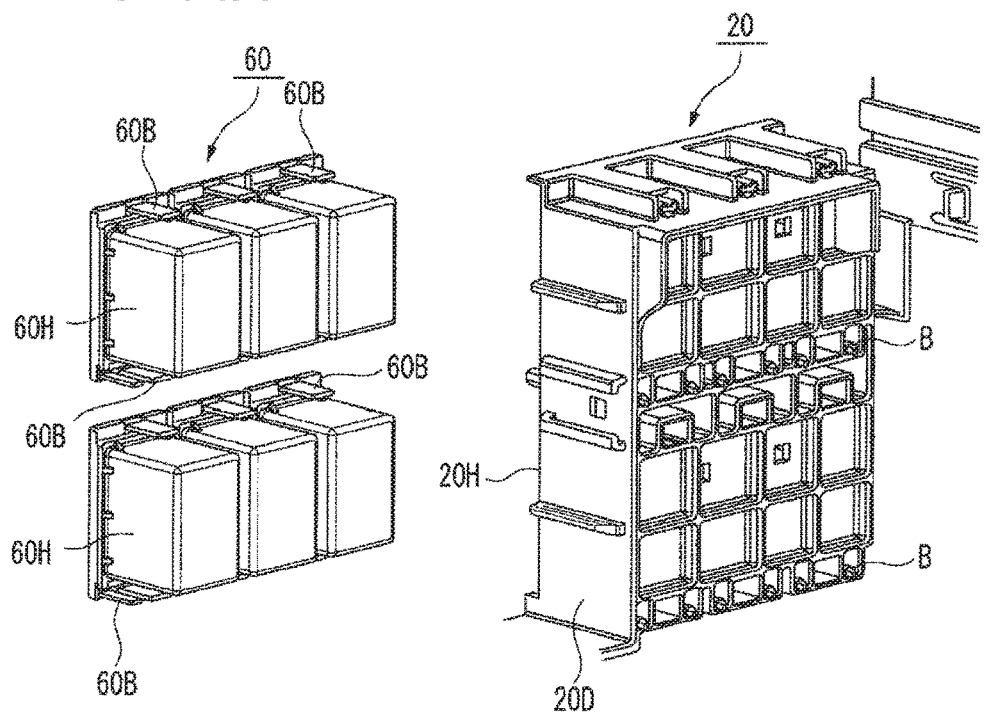
FIG. 14A is a perspective view of relays (60) and the common relay block (20) storing the relays (60)

Common relay storing chambers 20H each having a cavity-like shape are formed in the thick portion 20D so as to be opened on the back side of FIG. 3 though not shown in FIG. 3. Relays 60 (see FIG. 14A) are stored in the common relay storing chambers 20H. Each relay 60 is constituted by a relay body 60H and bus bar terminals 60B as shown in FIG. 14A.

<Frame Portion 20F>

The individual corresponding relay block 30 on the right side of FIG. 3 is fitted to the frame portion 20F, and is stored in an individual corresponding relay block storing chamber 23H formed in the common relay block 20. To this end, guide portions 20G are formed in the frame portion 20F so that the individual corresponding relay block 30 can be fitted easily. Correspondingly to the guide portions 20G, guide portions 30G are also formed on the individual corresponding relay block 30 side. Although the individual corresponding relay block 30 is described later, individual corresponding relay storing chambers 30H each having a cavity-like shape are formed in the individual corresponding relay block 30 so as to be opened on the back side of the FIG. 3 though not shown in FIG. 3. As illustrated, relays 60 are stored in the individual corresponding relay storing chambers 30H.

<Individual Corresponding Relay Block 30>

The individual corresponding relay block 30 (FIG. 3) is a plastic molding that can be fitted to the frame portion 20F formed in the vertical wall 20V of the common relay block 20. The individual corresponding relay block 30 has a box-like body in which individual corresponding relay storing chambers 30H each having a cavity-like shape and opened on the back side of FIG. 3 are formed in two upper and lower rows. Three individual corresponding relay storing chambers 30H are provided in each row. Guide portions 30G are formed on the individual corresponding relay block 30 side. The guide portions 30G cooperate with the guide portions 20G formed in the frame portion 20F of the common relay block 20 so that the individual corresponding relay block 30 can be fitted easily. As illustrated, six relays 60 are stored in the cavity-like individual corresponding relay storing chambers 30H.

<Individual Corresponding Relay Block 30 for Luxury Vehicles>

The individual corresponding relay block 30 configured thus stores six relays 60 for use in luxury vehicles.

<Individual Corresponding Relay Block 31 for Light Vehicles>

Figure 5A:
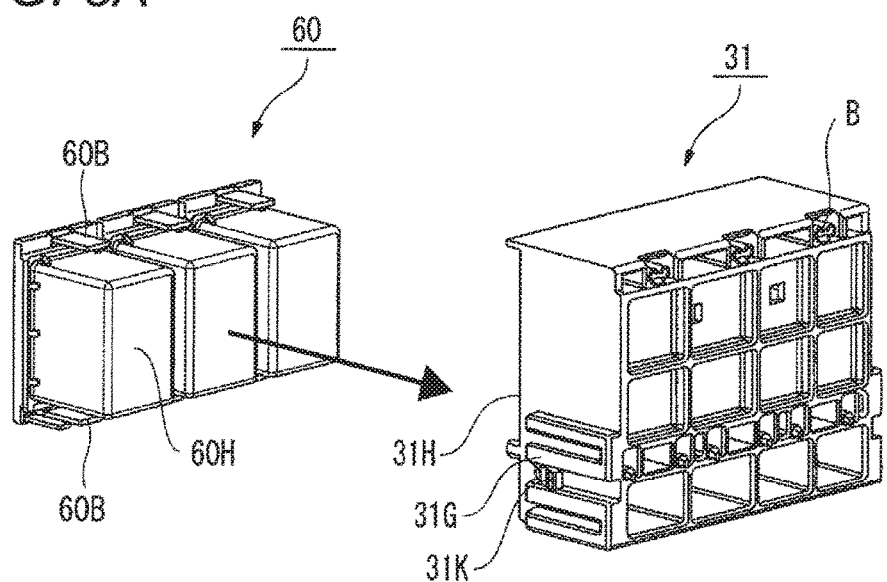
FIG. 5A and FIG. 5B are perspective views of an individual corresponding relay block (31) for light vehicles in which three relays (60) have been stored in relay storing chambers (31H).
Figure 5B:
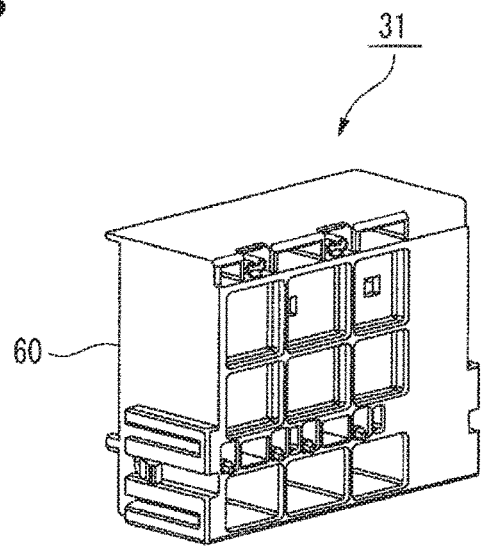

On the other hand, a light vehicle does not use such a large number of relays. Accordingly, as shown in FIGS. 5A and 5B, an individual corresponding relay block 31 for light vehicles uses only half the relays in FIG. 3. Thus, the individual corresponding relay block 31 for light vehicles is half as high as the individual corresponding relay block 30 for luxury vehicles. The number of relays 60 is three.

<Fitting Positions of Individual Corresponding Relay Blocks 30 and 31>

Figure 7A:
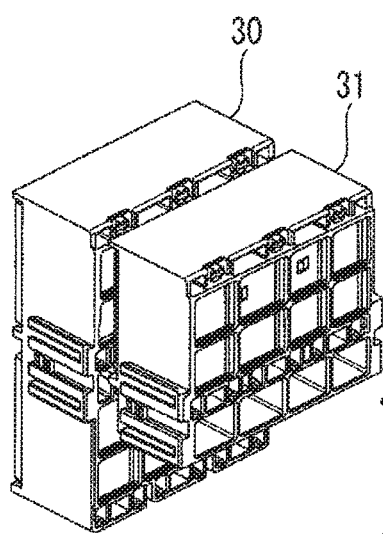
FIG. 7A and FIG. 7B are perspective views in which an individual corresponding relay block (30) has stored six relays (60) in FIG. 3 and an individual relay block (31) has stored three relays (60), FIG. 7A being a perspective view in which the individual corresponding relay block (31) has been placed in front of the individual corresponding relay block (30), FIG. 7B being a perspective view in which the individual corresponding relay block (30) has been placed in front of the individual corresponding relay block (31).
Figure 7B:
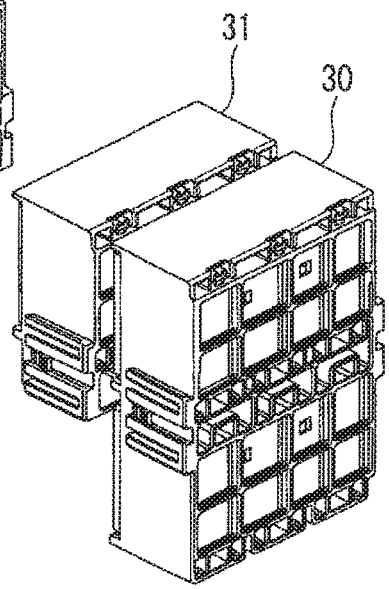

FIG. 7A and FIG. 7B are perspective views in which the individual corresponding relay block 30 stores six relays 60 as shown in FIG. 3 and the individual corresponding relay block 31 stores three relays 60. As is understood from FIG. 7A and FIG. 7B, the individual corresponding relay block 31 for light vehicles is half as high as the individual corresponding relay block 30 for luxury vehicles. The individual corresponding relay block 30 for luxury vehicles may be used as an individual corresponding relay block for light vehicles (the greater embraces the less). In the embodiment of the invention, such an idea is not used, but the individual corresponding relay block 30 for luxury vehicles is made distinct from the individual corresponding relay block 31 for light vehicles from the point of view as to resource saving and energy saving.

However, according to the embodiment of the invention, the individual corresponding relay block 31 for light vehicles can be fitted to the frame portion 20F formed in the vertical wall 20V of the common relay block 20 in the same manner as the individual corresponding relay block 30 for luxury vehicles though the individual corresponding relay block 31 for light vehicles is half as high as the individual corresponding relay block 30 for luxury vehicles.

FIG. 9 is a perspective view showing a state in which the individual corresponding relay block 31 for light vehicles has been fitted to the frame portion 20F formed in the vertical wall 20V (FIG. 3) of the common relay block 20.

Although the individual corresponding relay block 31 for light vehicles is half as high as the individual corresponding relay block 30 for luxury vehicles, the individual corresponding relay block 31 can be fitted to the upper half position of the frame portion 20F of the common relay block 20 without any problem because the guide portions 20G and 20G (FIG. 3) guiding the guide portions 31G and 31G of the individual corresponding relay block 31 are formed in the frame portion 20F of the common relay block 20.

<Common Power Supply Block 40>

The common power supply block 40 (FIG. 4) is a plastic molding mounted with components to be stored in the common power supply block storing chamber 24H formed on the back side of the ceiling portion 20T of the common relay block 20. The components include relays or fuses 40F that can be implemented electronically, and diodes 40D. Guide portions (not shown) are formed in the common power supply block 40 so that the common power supply block 40 can be easily guided to the common relay block 20.

In addition, locking portions 40K and 40K are formed at suitable places in order to keep the state where the common power supply block 40 is fitted to the common relay block 20.

In addition, L-shaped bus bar terminals 40B are provided so that electric connection to mating parts can be secured.

The bus bar terminals 40B of the common power supply block 40 are electrically connected to bus bar terminals 60B of the relays 60 stored in the common relay block 20 and the individual corresponding relay block 30 simultaneously when the blocks are fitted to one another. Thus, according to the embodiment of the invention, electric wires among relays can be connected automatically without U-turn connection performed manually in the background art.

<Electric Connection Between Bus Bar Terminals 40B and Bus Bar Terminals 60B>

Here, electric connection carried out between the bus bar terminals 40B and the bus bar terminals 60B according to the embodiment of the invention will be described by way of example.

Figure 4:
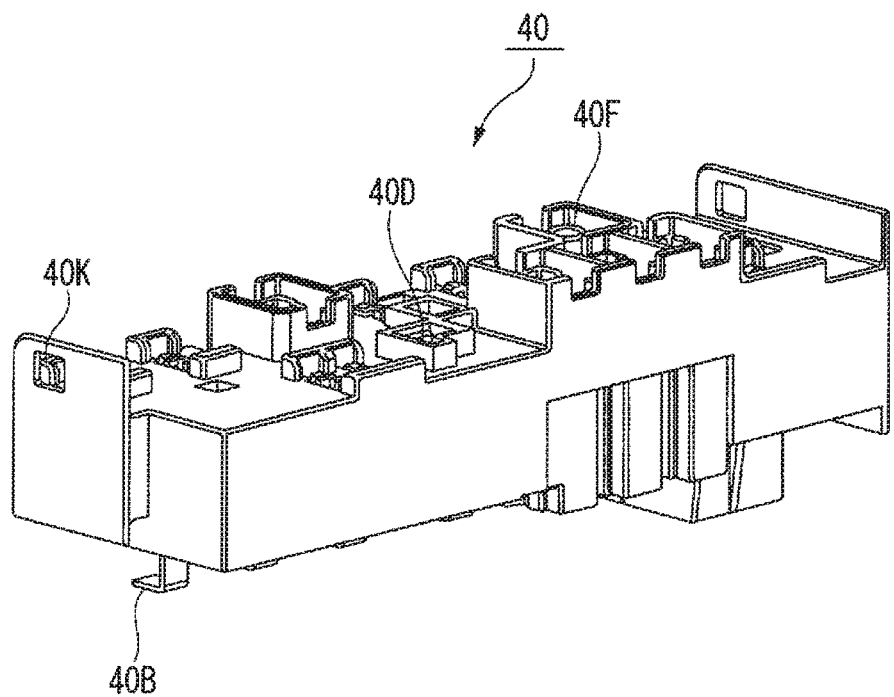
FIG. 4 is a perspective view of a common power supply block (40), which is a constituent part of the cassette type electrical junction box (100) in FIG. 1.
Figure 10:
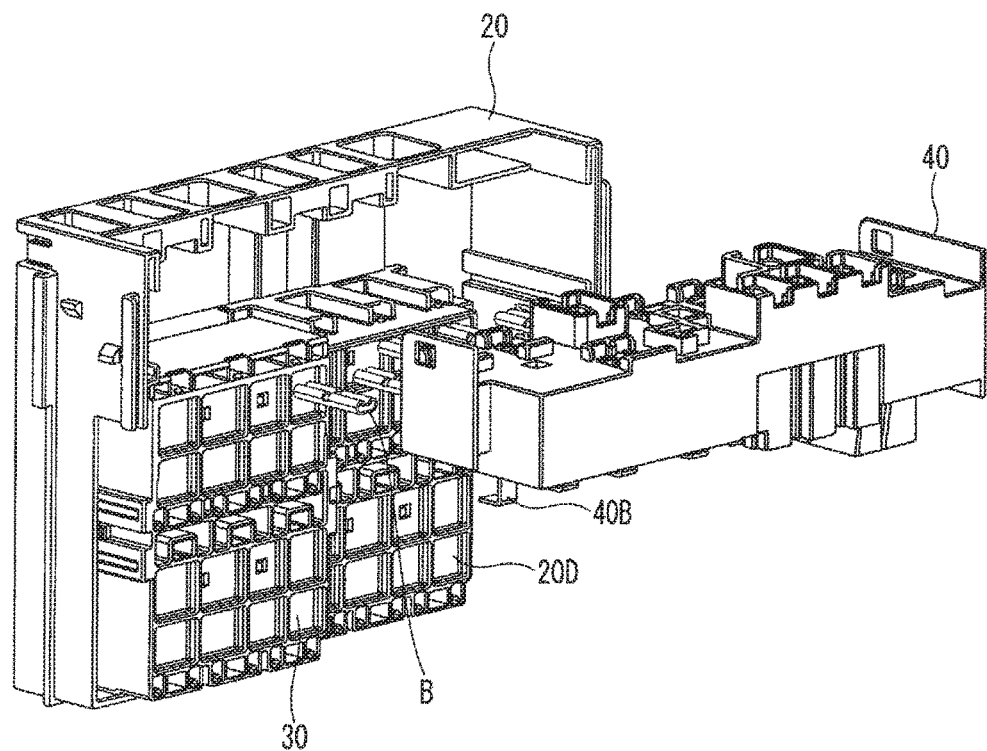
FIG. 10 is a perspective view depicting bus bars through which the common relay block (20) in FIG. 3 and the individual corresponding relay block (30) in FIG. 6 are electrically connected to the common power supply block (40) in FIG. 4.

FIG. 10 is a perspective view depicting the bus bars B through which the common relay block 20 in FIG. 3 and the individual corresponding relay block 30 in FIG. 6 are electrically connected to the common power supply block 40 in FIG. 4. Incidentally, in FIG. 10, for convenience of explanation, the bus bars B are depicted to project from the common relay block 20 and the individual corresponding relay block 30. However, in fact, the bus bars B stored in the common relay block 20 and the individual corresponding relay block 30 cannot be observed from the outside.

Figure 11:
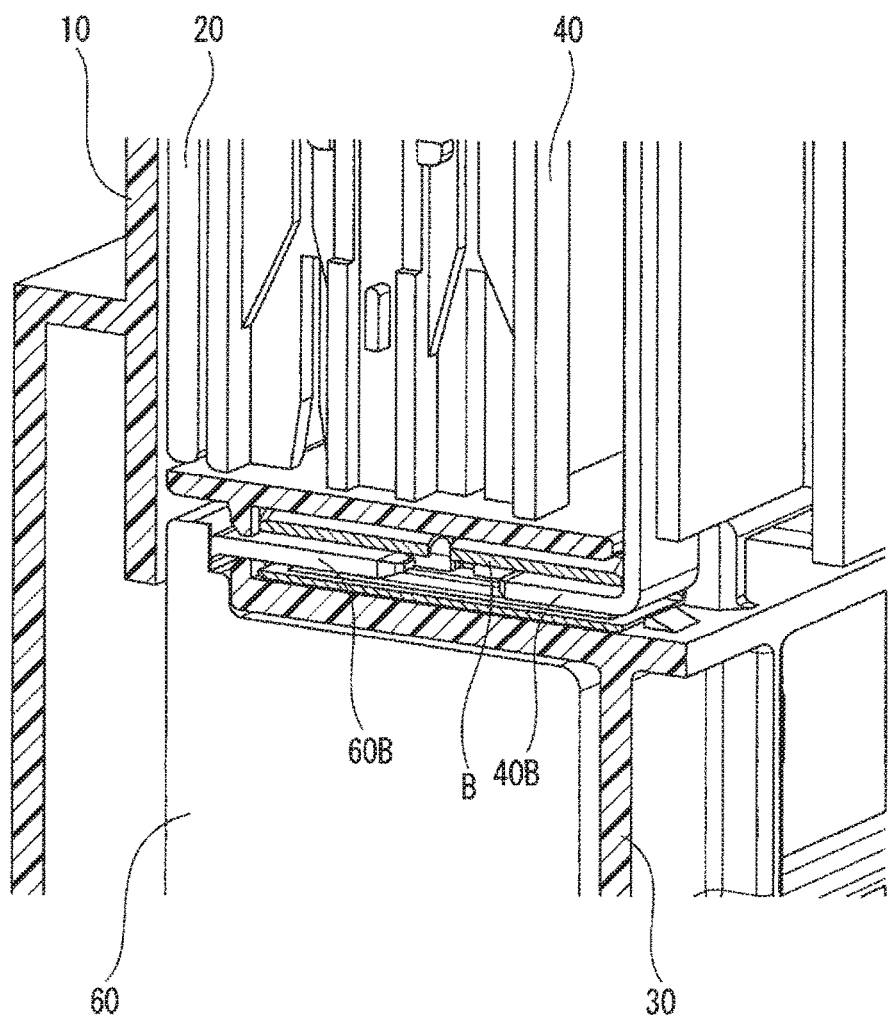
FIG. 11 is an enlarged perspective view showing a section of male/female parts of the bus bars in FIG. 10, in which the individual relay block (30) is electrically connected to the common power supply block (40).
Figure 13A:
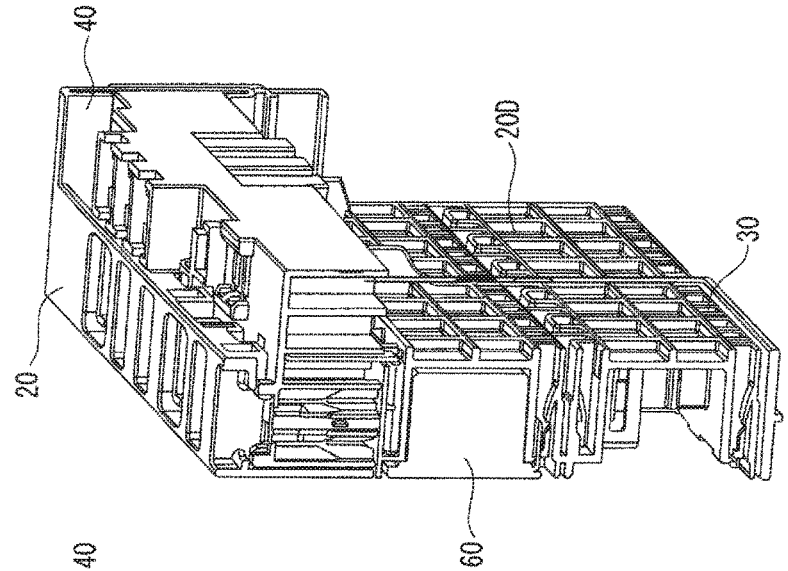
FIG. 13A is a perspective view of FIG. 12A showing the state before fitting.
Figure 13B:
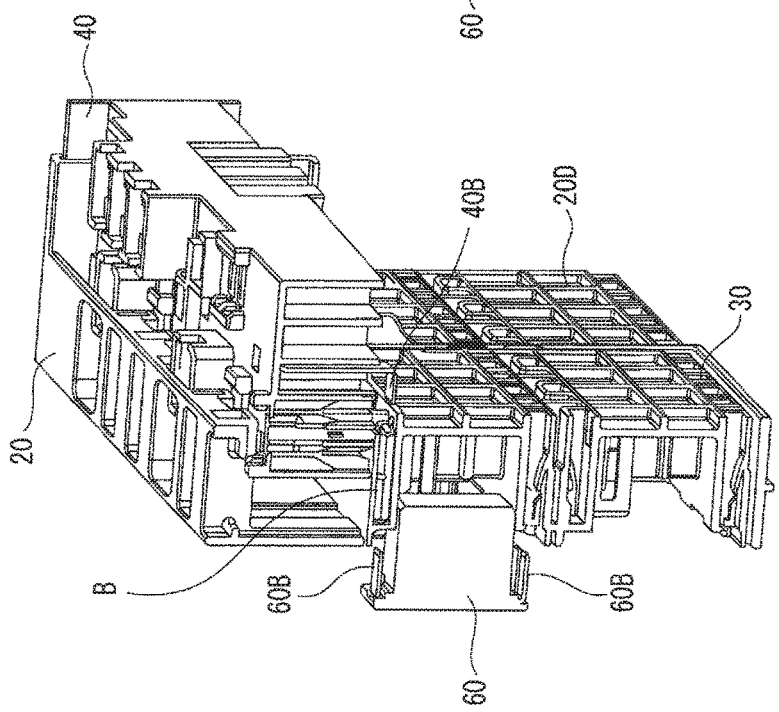
FIG. 13B is a perspective view of FIG. 12B showing the state after fitting.

In FIG. 10, the L-shaped bus bar terminals 40B (male type) of the common power supply block 40 are inserted into the bus bars B (female type) stored in the common relay block 20 and the individual corresponding relay block 30 so as to be brought into contact therewith. FIG. 11 enlarges and shows the state.

On the other hand, the L-shaped bus bar terminals 60B (male type: FIG. 3) of the relays 60 stored in the common relay block 20 and the individual corresponding relay block 30 are passed through gaps above the storing chambers in the individual corresponding relay block 30 and inserted into the bus bars B (female type) stored in the individual corresponding relay block 30 so as to be brought into contact therewith (FIG. 11), in the same manner.

In this manner, an L-shaped bus bar terminal 60B (male type) of a relay 60 and an L-shaped bus bar terminal 40B (male type) of the common power supply block 40 are inserted from the opposite ends of each straight bus bar B (female type) so as to be brought into contact therewith. Thus, each relay 60 can be electrically connected to the common power supply block 40 at the same time as the blocks are fitted to each other.

FIG. 12A and FIG. 12B are longitudinally sectional views showing a state before fitting in FIG. 12A and a state after fitting in FIG. 12B. Each longitudinal sectional view shows a state in which L-shaped bus bar terminals 60B of a relay 60 described above are electrically connected to bus bars B stored in the individual corresponding relay block 30 when the relay 60 is fitted to the individual corresponding relay block 30, and a state in which L-shaped bus bar terminals 40B of the common power supply block 40 are electrically connected to bus bars B stored in the common relay block 20 when the common power supply block 40 is fitted to the common relay block 20.

In FIG. 12A and FIG. 12B, as soon as a relay 60 is fitted to the individual corresponding relay block 30, L-shaped bus bar terminals 60B and 60B provided in an upper portion and a lower portion of the relay 60 are electrically connected to bus bars B and B stored in the individual corresponding relay block 30.

On the other hand, when the common power supply block 40 is fitted to the common relay block 20, L-shaped bus bar terminals 40B provided in a lower portion of the common power supply block 40 are electrically connected to bus bars B stored in the lower portion of the common relay block 20.

<Individual Corresponding Semiconductor Module 50>

Figure 8:
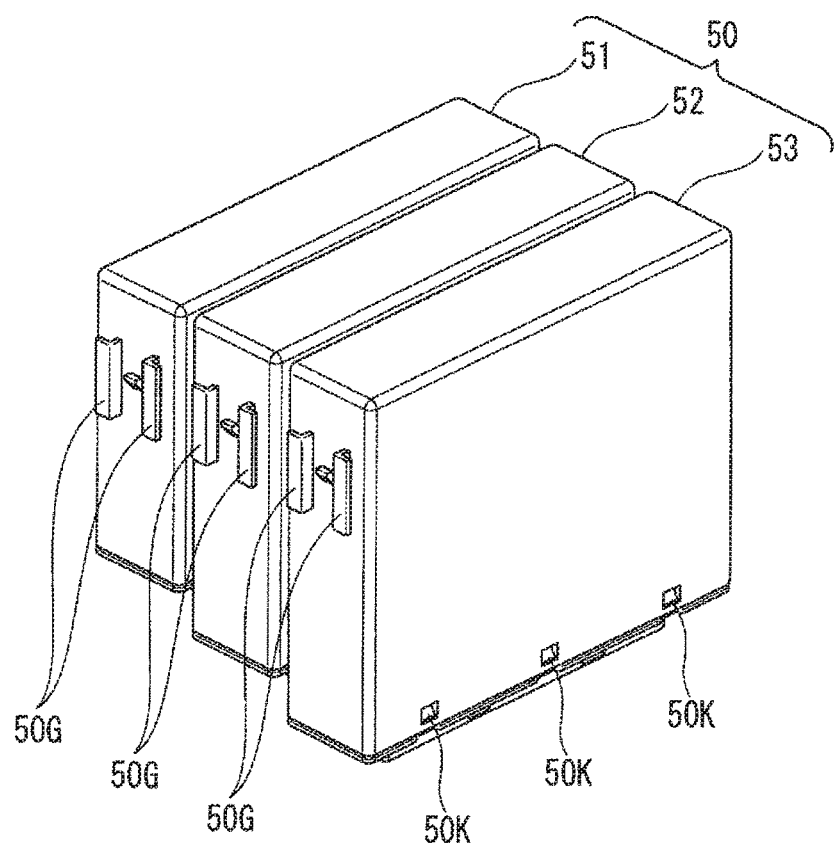
FIG. 8 is a perspective view of an individual corresponding semiconductor module (51, 52, 53), which is made of a plurality of kinds of modules having one and the same shape.

The individual corresponding semiconductor module 50 (FIG. 8) is a plastic molding having a flat rectangular parallelepiped shape, which can be stored in the individual corresponding semiconductor module storing chamber 15 of the electrical junction box housing 10 in FIG. 2. The individual corresponding semiconductor module 50 is a module in which, of relays that can be implemented electronically together with fuse blocks, mini-fuses, diodes, etc., relay circuits peculiar to each kind of vehicle have been modularized. Accordingly, the individual corresponding semiconductor module 50 is made up for each kind of vehicle. As shown in FIG. 8, the individual corresponding semiconductor module 50 is constituted by a plurality of kinds of individual corresponding semiconductor modules 51, 52 and 53 having one and the same shape. One of the individual corresponding semiconductor modules 51, 52 and 53 is fitted to the electrical junction box housing 10 (FIG. 2) and used. Each of the individual corresponding semiconductor modules 51, 52 and 53 includes guide portions 50G and locking portions 50K.

<Relay 60>

Figure 14B:
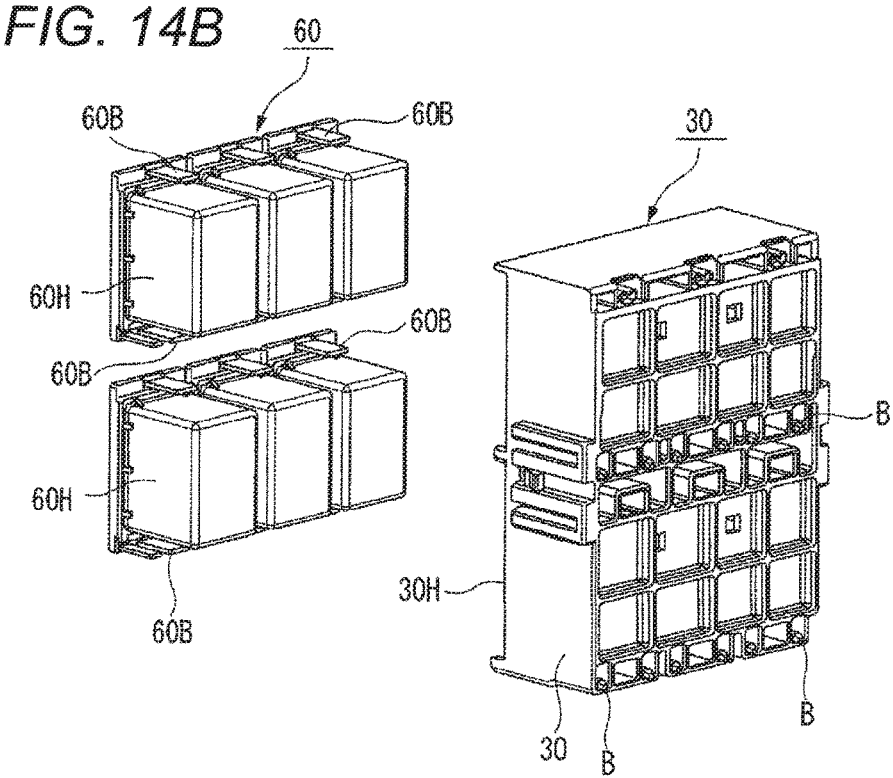
FIG. 14B is a perspective view of relays (60) and the individual corresponding relay block (30) in FIG. 6 storing the relays (60).

As shown in FIG. 14A and FIG. 14B, each relay 60 is constituted by a relay body 60H having a rectangular parallelepiped shape, and L-shaped bus bar terminals 60B provided in the upper and lower portions of the relay body 60H respectively.

Each relay 60 in FIG. 14A is stored in a cavity-like common relay storing chamber 20H of the common relay block 20. When the relay 60 is stored in the common relay storing chamber 20H, the L-shaped bus bar terminals 60B and 60B of the relay 60 are electrically connected to the straight bus bars B and B provided in the upper and lower portions of the common relay storing chamber 20H respectively.

On the other hand, each relay 60 in FIG. 14A is stored in a cavity-like individual corresponding relay storing chamber 30H of the individual corresponding relay block 30. When the relay 60 is stored in the individual corresponding relay storing chamber 30H, the L-shaped bus bar terminals 60B and 60B of the relay 60 are electrically connected to the straight bus bars B and B provided in the upper and lower portions of the individual corresponding relay storing chamber 30H respectively.

According to the embodiment of the invention, electric wires between relays or between each relay and another circuit component can be electrically connected not by U-turn connection performed manually in the background art but at the same time as components are fitted to each other.

<Summary>

Here, the features of the aforementioned cassette type electrical junction box (100) according to the embodiment of the invention will be summarized and listed briefly in the following configurations [i] to [vi].

[i] An electrical junction box (cassette type electrical junction box 100) including: an electrical junction box housing (10); and a common relay block (20), an individual corresponding relay block (30), a common power supply block (40), and an individual corresponding semiconductor module (50), which are attached to the electrical junction box housing.

[ii] The electrical junction box (100) according to the configuration [i], wherein the electrical junction box housing (10) includes a storing chamber, and wherein at least one block of the common relay block (20), the individual corresponding relay block (30) and the common power supply block (40), and the individual corresponding semiconductor module (50) are stored in the storing chamber of the electrical junction box housing (10), and a block that is not stored is stored in a storing chamber formed in the block that is stored.

[iii] The electrical junction box (100) according to the configuration [ii], wherein the common relay block (20) has an individual corresponding relay block storing chamber (23H) and a common power supply block storing chamber (24H), and wherein the individual corresponding relay block (30) is stored in the individual corresponding relay block storing chamber (23H), and the common power supply block (40) is stored in the common power supply block storing chamber (24H).

[iv] The electrical junction box (100) according to the configuration [ii] or [iii], wherein the individual corresponding semiconductor module (50) includes a plurality of kinds of modules (individual corresponding semiconductor modules 51, 52 and 53) having a same shape.

[v] The electrical junction box (100) according to any one of the configurations [i] to [iv], wherein each of the common relay block (20), the individual corresponding relay block (30), the common power supply block (40) and the individual corresponding semiconductor module (50) includes a bus bar that is electrically connectable to one another when fitted to one another.

[vi] The electrical junction box (100) according to any one of the configurations [i] through [v], wherein each of the electrical junction box housing (10), the common relay block (20), the individual corresponding relay block (30), the common power supply block (40) and the individual corresponding semiconductor module (50) includes a guide portion that can guide one another and a locking portion that can lock one another when fitted to one another.

According to the electrical junction box having the aforementioned configuration [i], the combination of the common relay block (20) and the common power supply block (40) is further combined with the most suitable individual corresponding relay block (30) and the most suitable individual corresponding semiconductor module (50). Thus, an electrical junction box for a desired kind of vehicle can be formed easily.

According to the electrical junction box having the aforementioned configuration [ii], blocks that are not stored in the electrical junction box housing (10) are stored in storing spaces of blocks that are stored in the electrical junction box housing. Thus, a small-sized electrical junction box can be formed.

According to the electrical junction box having the aforementioned configuration [iii], the common relay block (20) includes the individual corresponding relay block storing chamber (23H) and the common power supply block storing chamber (24H). Thus, a smaller-sized electrical junction box can be formed.

According to the electrical junction box having the aforementioned configuration [iv], the individual corresponding semiconductor module (50) includes a plurality of kinds of modules (51, 52 and 53) having one and the same shape. Of the modules, the most suitable individual corresponding semiconductor module can be selected. Thus, an electrical junction box for a desired kind of vehicle can be obtained.

According to the electrical junction box having the aforementioned configuration [v], each block includes bus bars that can be electrically connected to bus bars of another block. Only if the blocks are mechanically fitted to each other, the blocks can be also electrically connected to each other. U-turn connection of electric wires carried out manually in the background art is not necessary. Thus, the productivity is improved.

According to the electrical junction box having the aforementioned configuration [vi], each block includes guide portions for guiding another block and locking portion for locking another block when the blocks are fitted to each other. Thus, the blocks can be fitted to each other easily. In addition, once the blocks have been fitted to each other, they can be prevented from being released from the fitting.

Although the invention has been described in detail and with reference to its specific embodiment, it is obvious for those skilled in the art that various changes or modifications can be made on the invention without departing from the spirit and scope thereof.

According to the embodiment of the invention, a combination of a common relay block and a common power supply block is further combined with a most suitable individual corresponding relay block and a most suitable individual corresponding semiconductor module. Thus, an electrical junction box for a desired kind of vehicle can be formed easily. The embodiment of the invention having this advantage is useful for an electrical junction box (an electric junction block) such as a relay box or a fuse box for use in a vehicle such as a car.

What is claimed is:

1. An electrical junction box comprising:
an electrical junction box housing; and
a common relay block, an individual corresponding relay block, a common power supply block, and an individual corresponding semiconductor module, which are attached to the electrical junction box housing,
wherein the electrical junction box housing has a storing chamber, and
wherein at least one block of the common relay block, the individual corresponding relay block and the common power supply block, and the individual corresponding semiconductor module are stored in the storing chamber of the electrical junction box housing, and a block that is not stored is stored in a storing chamber formed in the block that is stored.

2. The electrical junction box according to claim 1,
wherein the common relay block has an individual corresponding relay block storing chamber and a common power supply block storing chamber, and
wherein the individual corresponding relay block is stored in the individual corresponding relay block storing chamber, and the common power supply block is stored in the common power supply block storing chamber.

3. The electrical junction box according to claim 1,
wherein the individual corresponding semiconductor module includes a plurality of kinds of modules having a same shape.

4. The electrical junction box according to claim 1,
wherein each of the common relay block, the individual corresponding relay block, the common power supply block and the individual corresponding semiconductor module comprises a bus bar that is electrically connectable to one another when fitted to one another.

5. The electrical junction box according to claim 1, wherein each of the electrical junction box housing, the common relay block, the individual corresponding relay block, the common power supply block and the individual corresponding semiconductor module comprises a guide portion that can guide one another and a locking portion that can lock one another when fitted to one another.

\* \* \* \* \*